H. SMITH.
Wire Gages.

No. 140,554.  Patented July 1, 1873.

Witnesses.  
Henry P. Cook  
Miles L. Peck

Inventor.  
Henry Smith  
By James Shepard, Atty.

UNITED STATES PATENT OFFICE.

HENRY SMITH, OF SOUTHINGTON, CONNECTICUT.

IMPROVEMENT IN WIRE-GAGES.

Specification forming part of Letters Patent No. 140,554, dated July 1, 1873; application filed January 27, 1873.

*To all whom it may concern:*

Be it known that I, HENRY SMITH, of Southington, in the county of Hartford and State of Connecticut, have invented a new and improved Wire Gage and Caliper, of which the following is a specification:

My invention consists in the employment of a cam-plate and a curved arm pivoted thereto and projecting over the edge of the cam-plate, so that by moving the arm upon the plate the distance between the edge of the plate and end of the arm will be changed, as hereafter described. It also consists in the combination of an index and scale with the foregoing, for the purpose of registering the distance between the end of the arm and edge of the plate, as hereafter described.

Figure 1:
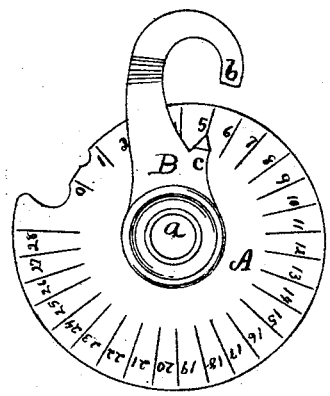
Figure 2:
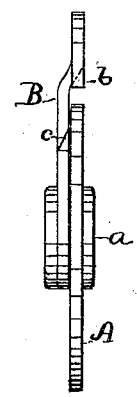

In the accompanying drawing, Figure 1 is a front elevation of a wire gage and caliper which embodies my invention, and Fig. 2 is a side elevation of the same.

A designates a plate, the edge of which forms a cam. Near the center of this cam-plate A I attach a curved arm, B, by means of a pin, *a*, or other hinge, so that the arm B can be swung around upon the plate, or the plate rotated while the arm is stationary. The outer end of the arm B, in addition to its curved form shown in Fig. 1, is curved flatwise, so as to bring its end *b* directly opposite the edge of the cam-plate A, as shown in Fig. 2. Now, it will be seen that by changing the position of the arm B upon the cam-plate A the distance between its edge and the end *b* of the arm B will also be changed, and thus the caliber of any drill, rod, or other object of a size within the range for which the tool is designed may be definitely gaged. If it is desired to use the device for registering the size of an object measured by it, in addition to its use as a simple caliper, I provide the arm B with an index, *c*, and the side of the cam-plate A with a scale properly graduated and marked with figures, (see Fig. 1,) denoting the various sizes of wire, according to a standard wire-gage; and thus when an object has been calipered, as before described, the index and scale will denote the number of gage of the object last measured. A pointer may be placed upon both sides of the cam-plate, and the scale upon one side may denote the English wire-gage, and that upon the other the American; or, if desired, a scale may be arranged to denote the distance between the end *b* of the arm B, and the edge of the plate A by inches and fractional parts thereof. By arranging a scale on a smaller circle placed within the outer scale, and providing the arm B with another index nearer its hub, two or more different scales may be denoted upon one side of the plate A.

This device is believed to be very useful as a caliper only.

Sizes of wire between the standard numbers can be definitely gaged with it, thus making the tool very convenient. It can also be produced for much less than can the ordinary wire-gage, as there is much less fitting required.

I claim as my invention—

1. The improved caliper herein shown, consisting of the cam-plate A and its arm B relatively arranged, substantially as and for the purpose described.

2. In combination with the subject matter of claim 1, the index *c* and a scale, substantially as and for the purpose described.

HENRY SMITH.

Witnesses:
 JAMES SHEPARD,
 STEPHEN WALKLEY.